United States Patent Office 2,774,772
Patented Dec. 18, 1956

2,774,772
DIHYDROPYRAN DERIVATIVES

Raymond I. Longley, Jr., Springfield, Mass., William S. Emerson, Glendale, Mo., and Theodore C. Shafer, Lafayette, Ind., assignors to Monsanto Chemical Company, St. Louis, Mo., a corporation of Delaware No Drawing. Application August 15, 1955, Serial No. 528,544

8 Claims. (Cl. 260—345.8)

The present invention relates to a new class of dihydropyrans and to a process of producing the same.

An abject of the invention is the provision of dihydropyrans having both an ether and carboxylate substituent. Another object of the invention is the provision of an easy method for the preparation of such dihydropyrans from readily available materials. A further object is the provision of a new series of chemical compounds which are useful as intermediates in the preparation of surface-active agents, therapeutic agents, dyestuffs, synthetic resins and plastics, fungicides, insecticides, parasiticides, etc. Other objects will be hereinafter disclosed.

While the prior art has provided various derivatives of dihydropyrans, the preparation of compounds in which the dihydropyran nucleus has attached to its carbons not only a carboxylate, but also an ether group has not been hitherto achieved. Inasmuch as for some specific purpose, e. g., for the preparation of non-ionic surface-active agents, the presence of both an ester group and an ether group in the dihydropyran structure is desirable, the present invention provides a new series of highly valuable chemical compounds.

According to the invention, 3,4-dihydro-1,2-pyrans having an ether and a carboxylate substituent are produced by reaction of α,β-mono-olefinic aldehydes with β-ether derivatives of esters of α,β-mono-olefinic acids.

It is well known that acrolein and its various alpha and/or beta derivatives, as compounds possessing conjugated double bonds of the type C=C—C=O, react readily with diolefinic hydrocarbons to yield carbocyclic compounds. These unsaturated aldehydes behave as dienophiles in the Diels-Alder reaction. Acrylic acid and many of its derivatives are also known dienophiles, likewise yielding carbocyclic adducts with diolefinic hydrocarbons. Now we have found that in spite of the fact that the acrolein compounds are known dienophiles, α-ether derivatives of acrylates and acrolein compounds react with each other to give addition products in a manner suggesting that during the addition reaction the acrolein compound behaves as a dienic rather than as a dienophilic component in a Diels-Alder reaction. The present reaction also differs from the generally known Diels-Alder reactions in that the addition products are heterocyclic compounds of oxygen, i. e., dihydropyrans, rather than carbocyclics.

The present dihydropyran derivatives are produced by the addition reaction of α,β-mono-olefinic aldehydes with β-ether derivatives of esters substantially according to the scheme:

$R^{I}CH{:}CR^{II}CHO + R^{III}C{=}C.COOR$
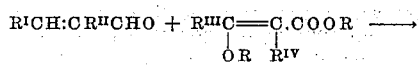
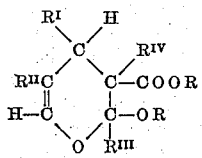

in which R is an alkyl radical of from 1 to 5 carbon atoms and $R^{I}$, $R^{II}$, $R^{III}$ and $R^{IV}$ are selected from the class consisting of the methyl radical and hydrogen. Hydrolysis of the dihydropyran esters with alkali yields the alkali salt. By treatment with mineral acid the carboxylic acid is liberated. It is readily converted to the alkali metal, alkaline earth metal, heavy metal and ammonium salts. Hence, the present invention generally provides compounds having the formula

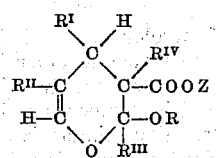

in which R, $R^{I}$, $R^{II}$, $R^{III}$ and $R^{IV}$ are as defined above and Z is a member of the group consisting of R, hydrogen and a salt-forming cation.

Unsaturated aldehydes useful for the present purpose may be generally represented by the formula $R^{I}CH{:}CR^{II}CHO$, in which $R^{I}$ and $R^{II}$ are as defined above. As aldehydes representative of this group may be mentioned acrolein, methacrolein, crotonaldehyde, etc.

β-ethers of esters of α,β-mono-olefinic acids that are employed with the above defined unsaturated aldehydes have the general formula

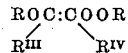

in which R, $R^{III}$, and $R^{IV}$ are as defined above. Examples of esters having this general formula may be mentioned ethyl β-ethoxyacrylate, n-propyl β-methoxyacrylate, ethyl β-(tert.-butoxy)crotonate, methyl β-methoxycrotonate, amyl β-(methoxymethoxy)crotonate, ethyl β-(ethoxy)-methacrylate, butyl β-(butoxy)-acrylate, etc.

The present invention thus provides a wide series of new dihydropyrans, the derivative obtained being a function of the aldehyde and the acrylate employed in the reaction. When $R^{I}$, $R^{II}$, $R^{III}$ and $R^{IV}$ in the structural formula given above is hydrogen, and R and Z are alkyl groups, the products are alkyl 2-alkoxy-3,4-dihydro-1,2-pyran-3-carboxylates, this class of compounds being obtainable from acrolein and alkyl β-alkoxy acrylates. Methyl 2-ethoxy-3,4-dihydro-1,2-pyran-3-carboxylate and isobutyl 3-methoxy-3,4-dihydro-1,2-pyran-3-carboxylate are examples of this class.

The presence of substituents in the 4 and 5 positions of the dihydropyran ether-ester is a function of the α,β-mono-olefinic aldehyde employed, for example, when an $R^{I}$ in the above structural formula for the aldehyde component is an alkyl group, e. g., as in crotonaldehyde, and R and Z in the ester structure are also alkyl, e. g., ethyl, the product is ethyl 2-ethoxy-4-methyl-3,4-dihydro-1,2-pyran-3-carboxylate.

Addition of the unsaturated aldehyde with the acrylate compound to form ether derivatives of 3,4-dihydro-1,2-pyran-3-carboxylic acid esters is effected by heating an α,β-mono-olefinic aldehyde with a member of the group consisting of the esters of an α,β-mono-olefinic acid, the reaction being performed under such conditions as to prevent any substantial polymerization. While any elevated temperature may be employed, the addition reaction is best conducted at, say, temperatures of 100° C. to 250° C., and for a period of from 1 to 50 hours. The desired dihydropyran derivative is then recovered from the reaction mixture, preferably by fractional distillation. In order to avoid, or at least minimize, polymerization of the reactants during the heating period, it is preferred to operate in the presence of an inhibitor of polymerization, e. g., hydroquinone, although with some of the aldehydes and esters, e. g., with those of higher molecular weight, polymerization can be substantially prevented by careful heating, i. e., heating at lower temperature and for a shorter time. The pressure conditions employed may be widely varied, depending upon the nature of the reactants used. When working with readily volatilizable materials, it is preferred to operate in a sealed container, whereby reaction pressure is built up during the heating time. Extraneous solvents or diluents may be employed but such materials are generally unnecessary.

The present invention is further illustrated, but not limited, by the following examples:

Example 1

48.5 grams of acrolein and 145.7 grams of ethyl β-ethoxyacrylate are mixed together in the presence of 0.5 grams of hydroquinone, and the mixture is charged to a reaction bomb. The temperature is slowly raised to 180° C. and the reaction mixture is allowed to stand at this temperature for 24 hours. At the end of this time the bomb and its contents are allowed to cool to room temperature and the reaction mixture is subsequently poured into a distilling flask. Fractionation of the mixture through a 48 inch Helix-packed column gives substantially pure ethyl 2-ethoxy-3,4-dihydro-1,2-pyran-3-carboxylate, B. P. 114° C.–116° C./17 mm.–19 mm. of mercury pressure, $n_D^{25}$ 1.4462, and analyzing as follows:

|  | Percent Carbon | Percent Hydrogen |
| --- | --- | --- |
| Calculated | 60.0 | 8.00 |
| Found | 60.5 | 7.90 |

Hydrolysis of the product with dilute alcoholic alkali gives the alkali salt of 2-ethoxy-3,4-dihydro-1,2-pyran-3-carboxylic acid, which can be subsequently converted to the free acid or other salts, e. g., the metal salts by reaction with the appropriate salt-forming reagent. In this manner there are obtainable materials of considerable importance in the dyestuffs, insecticide and fungicide industries such as the sodium, lead and copper salts.

Operating in like manner but using crotonaldehyde instead of acrolein, a good yield of ethyl 2-ethoxy-4-methyl-3,4-dihydro-1,2-pyran-3-carboxylate may be obtained. Similarly, when the aldehyde employed is cinnamaldehyde instead of acrolein the product may be ethyl 2-ethoxy-4-phenyl-3,4-dihydro-1,2-pyran-3-carboxylate.

Example 2

The ethyl 2-ethoxy-3,4-dihydro-1,2-pyran-3-carboxylate of Example 1 was converted to a resinous polymer by mixing it with about 1 percent by weight of boron trifluoride-ether complex and allowing the resulting reaction mixture to stand until polymerization, as evidenced by cessation in viscosity increase, is completed. The catalyst content of the reaction mixture was then neutralized by addition of water, and the water was subsequently distilled off. There was thus obtained as residue a light yellowish resin which was soluble in acetone and denatured alcohol. Films of the resin prepared by casting solutions of the same were substantially colorless, transparent products of good resistance to heat and sunlight. When the resinous polymeric carboxylate was dissolved in acetone or alcohol in a concentration of from 30 to 50 parts of resin in from 50 to 70 parts of solvent, and the resulting lacquer was brushed on test panels of wood, it air-dried to give an adherent film of good covering power.

In preparing the present ether-esters, generally, equimolar quantities of the α,β-mono-olefinic aldehyde and the α,β-mono-olefinic ester may be employed, since the reaction is one of simple addition. However, in many instances, particularly when working with a readily polymerizable aldehyde such as acrolein, an excess of the unsaturated ester is advantageously employed.

A variety of inhibitors of polymerization may be employed, e. g., instead of hydroquinone there may be used pyrogallol, β-naphthol, di-tert.-butylhydroquinone, etc.

Although the heating may be conducted at any elevated temperature, it is advantageous to operate below the decomposition temperature of the reactants and preferably at temperatures of from 100° C. to 250° C. The time of heating varies with the nature of the reactants as well as with the temperatures employed. When employing acrolein or its lower alkyl derivatives with the lower alkyl alkoxyacrylates, wherein the alkyl group has from one to five carbon atoms, a heating time of from 12 to 36 hours at a temperature of 100° C. to 200° C. is preferred. In recovering the reaction mixture from the bomb or other apparatus employed, an unreactive diluent, e. g., benzene or hexane, may be used to facilitate recovery of the entire reaction mixture, and such diluent may be separated from the crude reaction mixture during the fractionation. When the final product is a solid under ordinary atmospheric conditions, the solid may be separated from the reaction mixture by crystallization from an unreactive volatilizable solvent.

The olefinic double bond in the present ether-ester derivatives of dihydropyran permits participation of the present compounds in copolymerization and polymerization reactions and facilitates introduction of other substituents, e. g., the sulfonic acid group into the pyran ring structure. The present dihydropyrans are likewise readily halogenated and hydrogenated, the halogenation occurring first by addition to the double bond. Subsequent halogenation may replace nuclear hydrogen to give polyhalogenated tetrahydropyran ether-esters.

This case is a continuation-in-part of my application, Serial No. 145,914, filed February 23, 1950, now abandoned.

What is claimed is:

1. Alkyl 2-alkoxy-3,4-dihydro-1,2-pyran-3-carboxylates in which each alkyl radical and each alkoxy radical has from 1 to 5 carbon atoms.

2. Ethyl 2-ethoxy-3,4-dihydro-1,2-pyran-3-carboxylate.

3. Ethyl 2-ethoxy-4-methyl-3,4-dihydro-1,2-pyran-3-carboxylate.

4. The process which comprises heating at a temperature of from 100° C. to 300° C. an aliphatic, α,β-mono-olefinic aldehyde having the formula

R.CH:CR.CHO in which R is selected from the class consisting of hydrogen and the methyl radical, with a β-ether of an α,β-mono-olefinic ester having the formula

R'O.CR:CR.COOR' in which R is selected from the class consisting of hydrogen and the methyl radical and R' is an alkyl radical of from 1 to 5 carbon atoms, and recovering from the resulting reaction product a dihydropyran compound having the formula

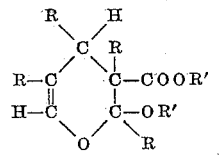

in which R is selected from the class consisting of hydrogen and the methyl radical and R' is an alkyl radical of from 1 to 5 carbon atoms.

5. The process which comprises heating acrolein, at a temperature of from 100° C. to 300° C., with an alkyl β-alkoxyacrylate in which each alkyl radical and each alkoxy radical has from 1 to 5 carbon atoms, and recovering from the resulting reaction product an alkyl 2-alkoxy-3,4-dihydro-1,2-pyran-3-carboxylate in which each alkyl radical and each alkoxy radical has from 1 to 5 carbon atoms.

6. The process which comprises heating acrolein with ethyl β-ethoxyacrylate, at a temperature of from 100° C. to 300° C., and recovering ethyl 2-ethoxy-3,4-dihydro-1,2-pyran-3-carboxylate from the resulting reaction product.

7. The process which comprises heating crotonaldehyde with ethyl β-ethoxyacrylate, at a temperature of from 100° C. to 300° C., and recovering ethyl 2-ethoxy-4-methyl-3,4-dihydro-1,2-pyran-3-carboxylate from the resulting reaction product.

8. Dihydropyran derivatives having the formula

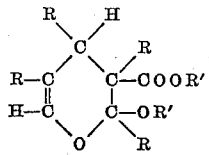

in which R is selected from the class consisting of hydrogen and the methyl radical and R' is an alkyl radical of from 1 to 5 carbon atoms.

References Cited in the file of this patent
UNITED STATES PATENTS

| | | |
|---|---|---|
| 2,514,168 | Smith et al. | July 4, 1950 |
| 2,658,081 | Emerson et al. | Nov. 3, 1953 |

OTHER REFERENCES

Schulz et al.: Angewandte Chemie, vol. 62 (1950), pp. 109–13.